(12) United States Patent
Ham et al.

(10) Patent No.: US 11,889,152 B2
(45) Date of Patent: Jan. 30, 2024

(54) ELECTRONIC DEVICE AND CONTROL METHOD THEREOF

(71) Applicant: Samsung Electronics Co., Ltd., Suwon-si (KR)

(72) Inventors: Jina Ham, Suwon-si (KR); Wonjong Choi, Suwon-si (KR); Soofeel Kim, Suwon-si (KR); Yewon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/609,669

(22) PCT Filed: Jun. 24, 2020

(86) PCT No.: PCT/KR2020/008123
§ 371 (c)(1),
(2) Date: Nov. 8, 2021

(87) PCT Pub. No.: WO2021/107308
PCT Pub. Date: Jun. 3, 2021

(65) Prior Publication Data
US 2022/0232290 A1 Jul. 21, 2022

(30) Foreign Application Priority Data
Nov. 27, 2019 (KR) .................. 10-2019-0154750

(51) Int. Cl.
*H04N 21/472* (2011.01)
*H04N 21/422* (2011.01)
(Continued)

(52) U.S. Cl.
CPC ....... *H04N 21/47202* (2013.01); *G06F 3/167* (2013.01); *H04N 21/42203* (2013.01); *H04N 21/4884* (2013.01)

(58) Field of Classification Search
CPC .............. H04N 23/90; H04N 21/4223; H04N 21/2187; H04N 21/47202; H04N 21/42203; H04N 21/4884; G06F 3/167
See application file for complete search history.

(56) References Cited

U.S. PATENT DOCUMENTS

| 6,950,782 B2 | 9/2005 | Qiao et al. |
| 8,259,176 B2 | 9/2012 | Misawa et al. |

(Continued)

FOREIGN PATENT DOCUMENTS

| JP | 2005-048770 A | 2/2005 |
| JP | 2007-286569 A | 11/2007 |

(Continued)

*Primary Examiner* — Jason Salce
(74) *Attorney, Agent, or Firm* — Jefferson IP Law, LLP

(57) ABSTRACT

An electronic device and a control method thereof are provided. The electronic device includes a camera, a microphone, a display, a communicator including circuitry, a memory, and a processor configured to capture an image of an external device through the camera and obtain information on the external device, based on a user's voice for requesting for solution information for solving a problem regarding the external device being input through the microphone while obtaining the information on the external device, control the communicator to transmit the input user's voice and the information on the external device to a server, receive a content related to the solution information from a content of a device related to the external device from the server via the communicator, and control the display to provide the content related to the solution information along with the captured image.

13 Claims, 12 Drawing Sheets

(51) Int. Cl.
*H04N 21/488* (2011.01)
*G06F 3/16* (2006.01)

(56) References Cited

U.S. PATENT DOCUMENTS

| | | | |
|---|---|---|---|
| 11,164,000 B2 | 11/2021 | Lee et al. | |
| 2009/0063969 A1* | 3/2009 | White | H04N 7/17318 |
| | | | 348/E7.083 |
| 2013/0304897 A1* | 11/2013 | Suri | H04L 41/0631 |
| | | | 709/224 |
| 2014/0289323 A1 | 9/2014 | Kutaragi et al. | |
| 2015/0067018 A1* | 3/2015 | Connolly | G06Q 30/016 |
| | | | 709/202 |
| 2015/0146007 A1* | 5/2015 | Dusik | G06V 20/20 |
| | | | 348/161 |
| 2018/0278751 A1 | 9/2018 | Stepanian | |
| 2019/0138530 A1 | 5/2019 | Yoshitake et al. | |
| 2019/0199845 A1 | 6/2019 | Choi et al. | |
| 2019/0340234 A1 | 11/2019 | Kosaka | |
| 2020/0042795 A1 | 2/2020 | Lee et al. | |
| 2020/0184963 A1* | 6/2020 | Joseph | G06F 3/167 |

FOREIGN PATENT DOCUMENTS

| | | |
|---|---|---|
| JP | 2010-165321 A | 7/2010 |
| JP | 2013-088906 A | 5/2013 |
| JP | 5866728 B2 | 2/2016 |
| JP | 2019-032685 A | 2/2019 |
| JP | 2019-194853 A | 11/2019 |
| KR | 10-1714983 B1 | 3/2017 |
| KR | 10-2017-0040492 A | 4/2017 |
| KR | 10-1760871 B1 | 7/2017 |
| KR | 10-1828869 B1 | 2/2018 |
| KR | 10-2019-0104282 A | 9/2019 |

* cited by examiner (a)

(b)

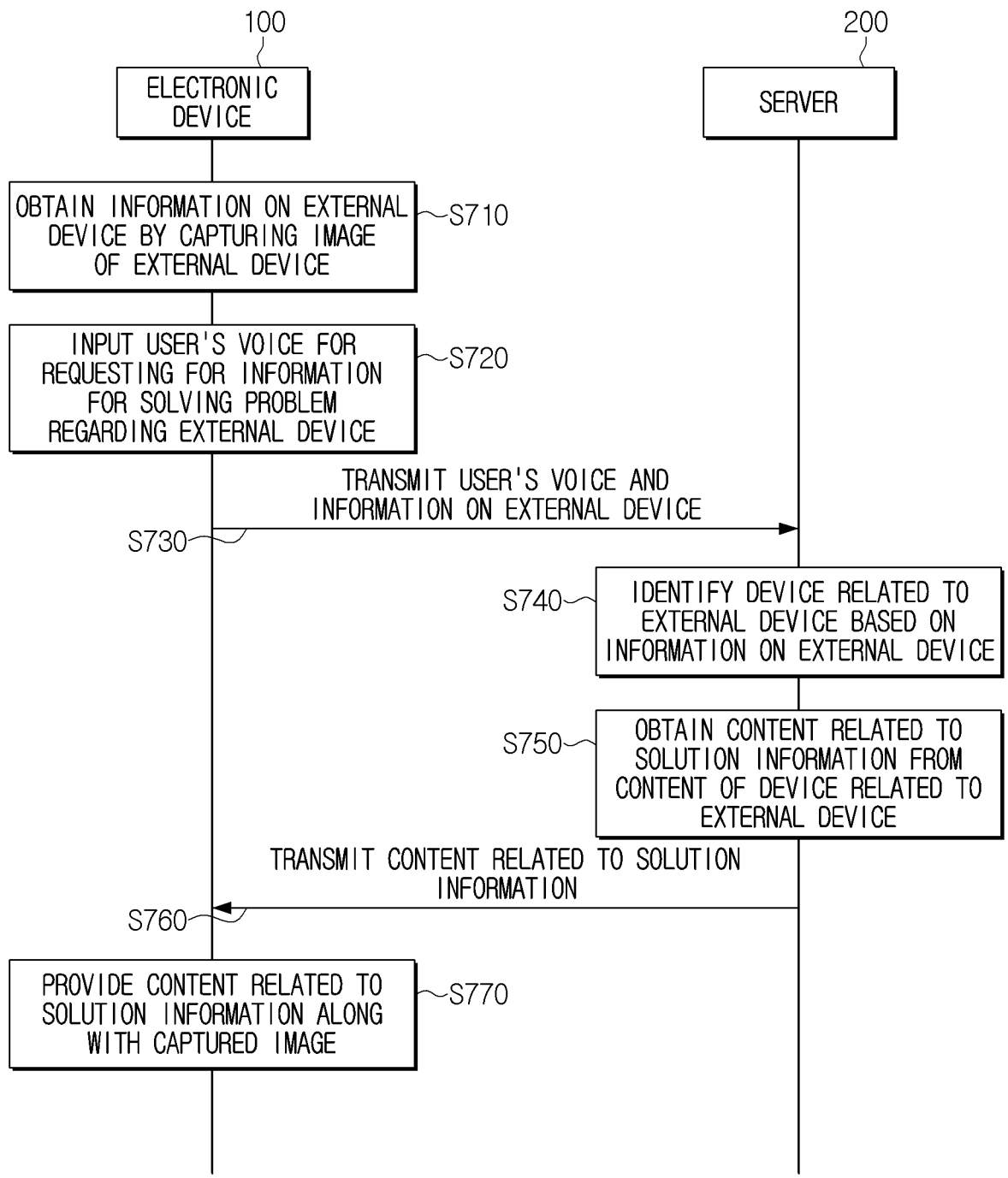

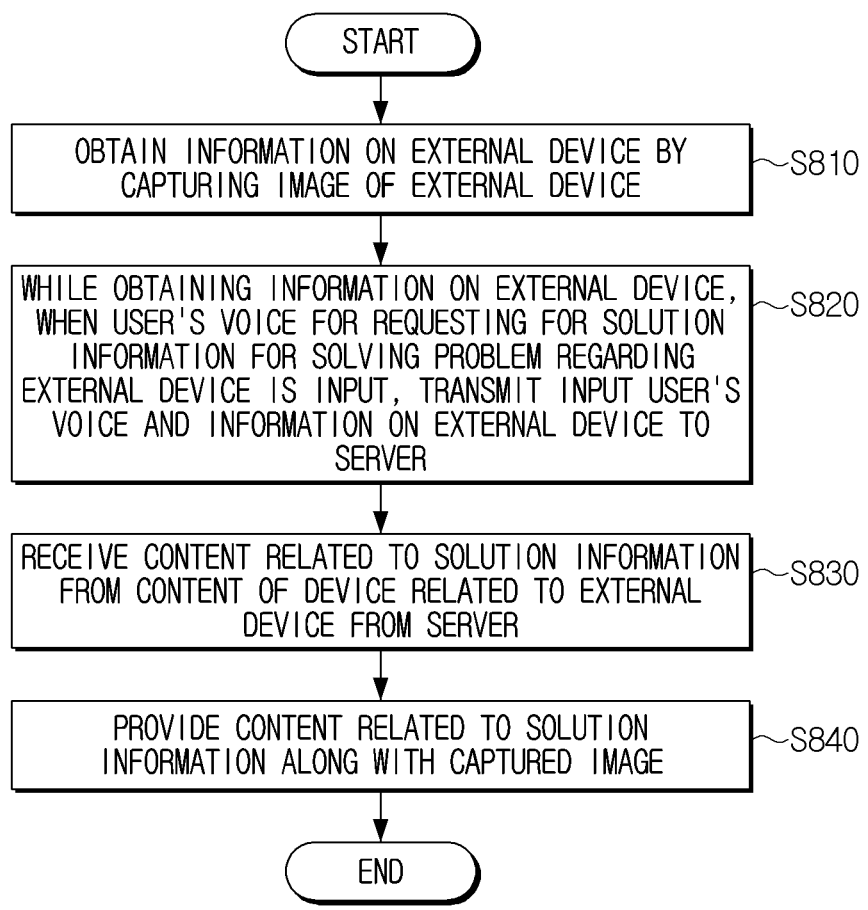

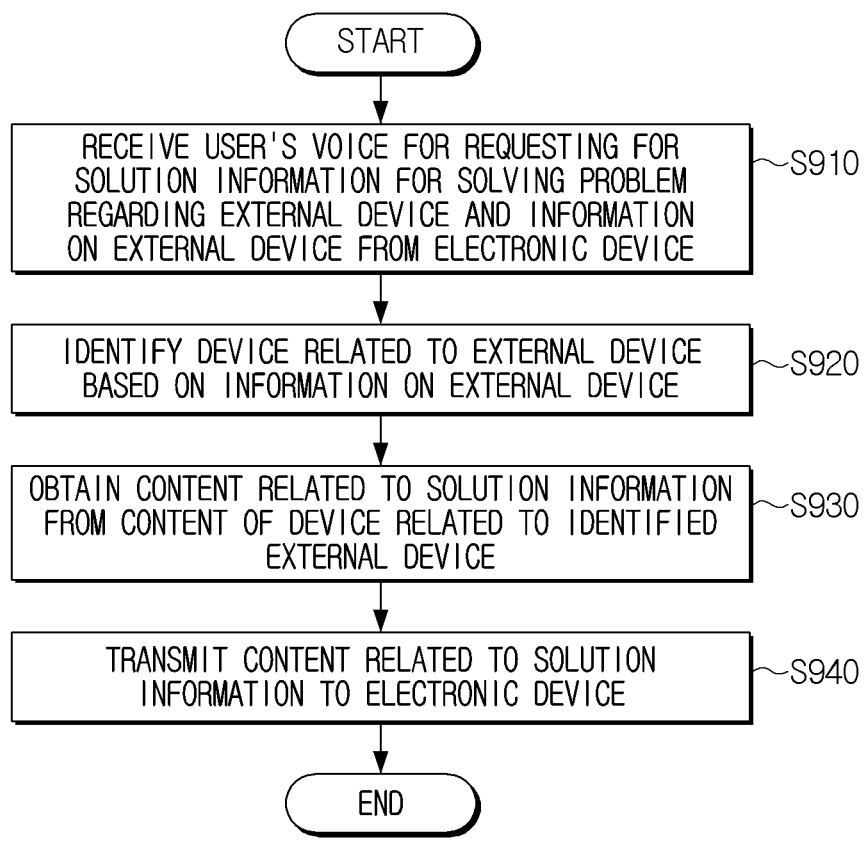

ELECTRONIC DEVICE AND CONTROL METHOD THEREOF

CROSS-REFERENCE TO RELATED APPLICATION(S)

This application is a U.S. National Stage application under 35 U.S.C. § 371 of an International application number PCT/KR2020/008123, filed on Jun. 24, 2020, which is based on and claims priority of a Korean patent application number 10-2019-0154750, filed on Nov. 27, 2019, in the Korean Intellectual Property Office, the disclosure of which is incorporated by reference herein in its entirety.

BACKGROUND

1. Field

The disclosure relates to an electronic device and a control method thereof. More particularly, the disclosure relates to an electronic device which provides solution information for solving a problem regarding an external device based on a user's voice and an image of the external device, and a control method thereof.

2. Description of Related Art

Along with development of a voice recognition technology using machine learning (e.g., deep learning), a technology of providing information on a method for solving a problem, when a user's voice for requesting for a solution of the problem regarding a specific device is input, has been used.

However, in a technology of the related art, if the user requests for the method for solving the problem regarding the specific device, there is a limit that a solution video may be provided to the user, only when a solution video produced based on the specific device is stored in advance. Accordingly, if the solution video and the like for a previous model of the specific device is not stored in advance, the user may not receive a content on the solution method by using the voice recognition technology.

In addition, each time when a new model of the specific device is released, it is necessary to change the content of the existing solution method so as to correspond to the changed specification, by comparing the new model with the previous model.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide the advantages described below. Accordingly, an aspect of the disclosure is to provide an electronic device which provides a content related to solution information based on a user's voice for requesting for the solution information to solve a problem regarding an external device and an image of the external device, and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a microphone, a display, a communicator comprising circuitry, a memory, and a processor configured to capture an image of an external device through the camera and obtain information on the external device, based on a user's voice for requesting for solution information for solving a problem regarding the external device being input through the microphone while obtaining the information on the external device, control the communicator to transmit the input user's voice and the information on the external device to a server, receive a content related to the solution information from a content of a device related to the external device from the server via the communicator, and control the display to provide the content related to the solution information along with the captured image.

In accordance with another aspect of the disclosure, a server is provided. The server includes a communicator including circuitry, a memory, and a processor configured to receive a user's voice for requesting for solution information for solving a problem regarding an external device and information on the external device from an electronic device via the communicator, identify a device related to the external device based on the information on the external device, obtain a content related to the solution information from a content of the identified device related to the external device, and control the communicator to transmit the content related to the solution information to the electronic device.

In accordance with another aspect of the disclosure, a method for controlling an electronic device is provided. The method includes capturing an image of an external device through a camera and obtaining information on the external device, based on a user's voice for requesting for solution information for solving a problem regarding the external device being input through a microphone while obtaining the information on the external device, transmitting the input user's voice and the information on the external device to a server, receiving a content related to the solution information from a content of a device related to the external device from the server, and providing the content related to the solution information along with the captured image.

In accordance with another aspect of the disclosure, a method for controlling a server is provided. The method includes receiving a user's voice for requesting for solution information for solving a problem regarding an external device and information on the external device from an electronic device, identifying a device related to the external device based on the information on the external device, obtaining a content related to the solution information from a content of the identified device related to the external device, and transmitting the content related to the solution information to the electronic device.

According to various aspects of the disclosure described above, the electronic device provides the content related to the solution information based on the user's voice for requesting for the solution information for solving the problem regarding the external device and the image of the external device, so that the user may use the content related to solution information of various problems more accurately.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a sequence diagram illustrating operations between an electronic device and a server according to an embodiment of the disclosure;

FIG. 8 is a flowchart illustrating a method for controlling an electronic device according to an embodiment of the disclosure; and FIG. 9 is a flowchart illustrating a method for controlling a server according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
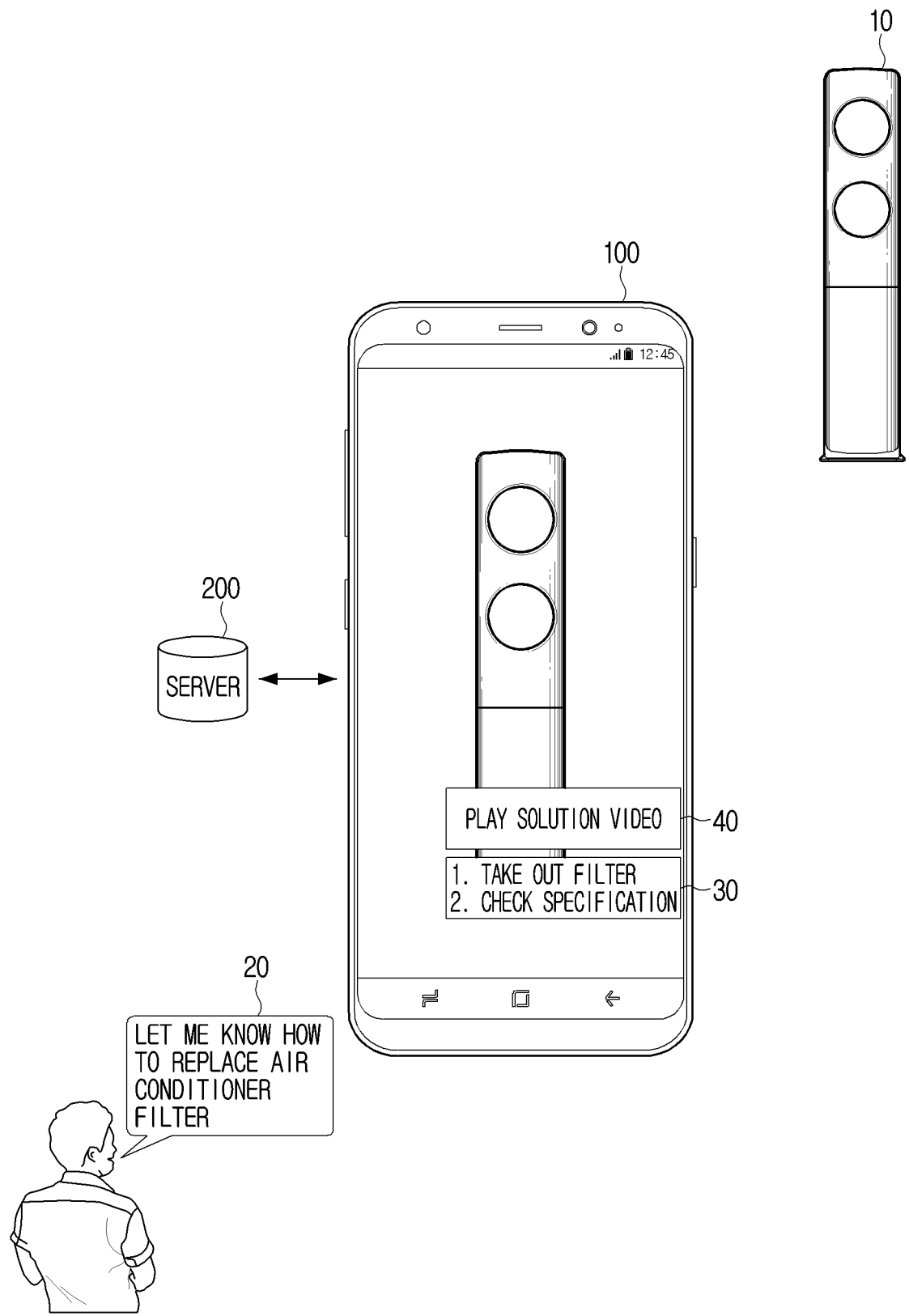
FIG. 1 is a diagram illustrating operations of an electronic device and a server according to an embodiment of the disclosure.

FIG. 1 is a diagram illustrating operations of an electronic device and a server according to an embodiment of the disclosure.

Referring to FIG. 1, an electronic device 100 may capture an image of an external device 10 through a camera 110 to obtain information on the external device 10.

The information on the external device 10 may include an image of the external device 10 (or feature data of the external device 10 obtained by inputting the image to an artificial intelligence model, such as a convolutional neural network (CNN) (e.g., a feature map)). In addition, the information on the external device 10 may include identification data of the external device 10 (e.g., a product name, a product number, a manufacturer, a production year, and the like) obtained through the image of the external device 10. Specifically, the electronic device 100 may obtain the identification data of the external device 10 through a barcode, a quick response (QR) code, or the like included in the image of the external device 10. Meanwhile, referring to FIG. 1, the external device 10 is implemented as an air conditioner, but this is merely an embodiment of the disclosure, and the external device 10 may be implemented as various devices.

Meanwhile, while obtaining the information on the external device 10, when a user's voice (e.g., "Let me know how to replace the air conditioner filter") 20 for requesting for solution information for solving a problem regarding the external device 10 is input through a microphone 120, the electronic device 100 may transmit the input user's voice 20 and the information on the external device 10 to a server 200.

When the user's voice and the information on the external device 10 are received, the server 200 may identify a device related to the external device based on the information on the external device.

In an embodiment of the disclosure, the server 200 may input the image of the external device 10 or the feature data of the external device 10 to an appearance recognition model received from the electronic device 100 to obtain an appearance similarity value between pre-stored devices and the external device 10. The appearance similarity value is a value obtained by outputting a numerical value of the similarity between the feature data of the external device 10 and feature data of pre-stored devices. The server 200 may identify a device having the appearance similarity value exceeding a threshold value as the device related to the external device 10. The server 200 may identify and obtain a content of the identified device related to the external device 10 among pre-stored contents. The number of devices related to the external device 10 having the appearance similarity value with the external device 10 exceeding the threshold value may be more than one. However, this is merely an embodiment of the disclosure, and the server 200 may identify a device having a maximum appearance similarity value with the external device 10 as the device related to the external device 10.

Meanwhile, in another embodiment of the disclosure, the server 200 may identify the device related to the external device 10 by using identification data of the external device 10 received from the electronic device 100. In other words, the server 200 may identify the device related to the external device 10 by comparing or matching at least one of a product name, a product number, a manufacturer, and a production year among the identification data of the external device 10 or all of them in sequence. For example, if the production year of the external device 10 is 2018, the manufacturer is S corporation, and the product name is an air conditioner, the server 200 may identify a device of which the production year is 2018, the manufacturer is S corporation, and the product name is an air conditioner, among the pre-stored devices, as the device related to the external device 10. In still another embodiment of the disclosure, the server 200 may identify a device having a product number with a smallest error from the product number of the external device 10 as the device related to the external device 10.

Meanwhile, the server 200 may obtain a content related to the solution information from the content of the identified device related to the external device. Specifically, while identifying the device related to the external device, the server 200 may grasp meaning of the user's voice by inputting the user's voice for requesting for the solution information for solving the problem regarding the external device 10 to a second dialogue system. The server 200 may search for and obtain a content related to the solution information capable of solving the problem regarding the external device from the obtained content of the device related to the external device 10. The content related to the solution information from the content of the device related to the external device 10 may include at least one of a manual of the device related to the external device 10, a video content related to the solution information from a guide video content of the device related to the external device 10, and a subtitle of the video content related to the solution information. The server 200 may transmit the content related to the solution information to the electronic device 100. The manual (or instruction manual) may be a text including a specification, a method of use, and the like of the device related to the external device 10, but this is merely an embodiment of the disclosure, and a video or an image of the device related to the external device 10 may be further included.

When the content related to the solution information is received from the server 200, the electronic device 100 may provide the content related to the solution information along with the captured image. For example, referring to FIG. 1, the electronic device 100 may display a text 30 corresponding to the solution information from the manual or a hyper link 40 for viewing a video content related to the solution information on the captured image of the external device 10.

Specifically, the electronic device 100 may grasp the intent of the user's voice by inputting the user's voice to a first dialogue system. Meanwhile, the electronic device 100 may grasp the intent of the user's voice when the content related to the solution information is received from the server 200, however this is merely an embodiment of the disclosure, and the electronic device 100 may grasp the intent of the user's voice through the first dialogue system when the user's voice is input through the microphone 120 or after a threshold period of time from the input.

The electronic device 100 may obtain a text corresponding to the solution information from the manual of the device related to the external device. For example, when a user's voice 20 for requesting for the method for replacing the air conditioner filter is input, the electronic device 100 may input the user's voice to the first dialogue system to identify that the user requests for the information on the method for replacing the air conditioner filter. The electronic device 100 may search for and obtain a text related to the replacement of the air conditioner from the manual.

The electronic device 100 may identify whether a region corresponding to the solution information exists in an image of the external device 10 based on the obtained text. Specifically, the electronic device 100 may analyze the obtained text to identify a region or a location corresponding to the solution information of the device related to the external device. For example, the electronic device 100 may analyze a language of the text regarding the location of the air conditioner filter (e.g., "Please take out the filter located at a lower right side) from the obtained text through the first dialogue system to identify the region or the location where the filter is located on the device related to the external device 10.

If it is identified that the filter is located in a lower right region of the device related to the external device 10, the electronic device 100 may predict that the filter exists in the lower right region of the external device 10. The electronic device 100 may identify whether the lower right region of the external device 10 is displayed on the image of the external device 10 obtained through the camera 110.

If it is identified that the region corresponding to the solution information does not exist in the image of the external device 10 obtained through the camera 110, the electronic device 100 may provide a message instructing to capture an image of the external device 10 corresponding to the solution information. For example, if it is identified that the lower right region of the external device 10 is not displayed on the image of the external device 10 obtained through the camera 110, the electronic device 100 may provide a message instructing to capture the lower right region of the external device 10.

Meanwhile, if it is identified that the region corresponding to the solution information exists in the image of the external device 10, the electronic device 100 may display the text 30 corresponding to the solution information on the identified region. For example, referring to FIG. 1, the electronic device 100 may display the text related to the replacement of the air conditioner filter from the manual on the lower right side of the image.

If it is identified that the region corresponding to the solution information exists in the image of the external device 10, the electronic device 100 may obtain a subtitle related to the text corresponding to the solution information from the subtitle of video content related to the solution information. For example, the electronic device 100 may obtain the subtitle related to the replacement of the air conditioner filter from the subtitle of the video content. The electronic device 100 may identify a point when the obtained subtitle is displayed on the video content (e.g., from 1 min 20 sec to 2 min to 30 sec with respect to a video reproduction start point). In an embodiment of the disclosure, the electronic device 100 may extract and obtain a video content corresponding to the identified point from the video content. In another embodiment of the disclosure, the electronic device 100 may control a progress bar of the video content so that the video content is reproduced from the start time (e.g., 1 min 20 sec with respect to the video reproduction start point) from the identified point.

The electronic device 100 may display at least one of a graphical user interface (GUI) or a hyper link capable of viewing the video content extracted from the video content or the video content reproduced from the identified point on the region corresponding to the solution information on the image of the external device 10. For example, referring to FIG. 1, the electronic device 100 may display the hyper link 40 implemented as a text "solution video" to show the video content corresponding to the identified point. If at least one of the GUI or the hyper link is selected (e.g., selected through a user touch or a user's voice), the electronic device 100 may display the video content corresponding to the identified point on a region of the image of the external device. The electronic device 100 may display the video content corresponding to the identified point on the region (e.g., lower right side) corresponding to the solution information of the image of the external device 10, but this is merely an embodiment of the disclosure, and the video content may be displayed on the entire region of a background or a display 150.

Figure 2:
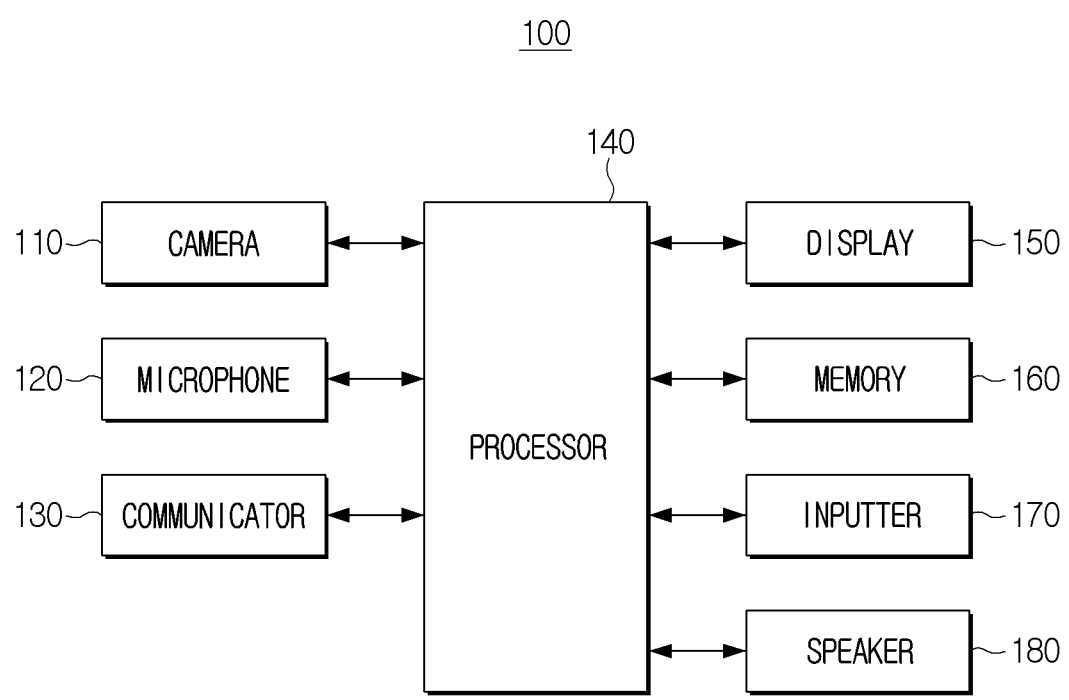
FIG. 2 is a block diagram specifically illustrating a configuration of an electronic device according to an embodiment of the disclosure.

FIG. 2 is a block diagram specifically illustrating a configuration of an electronic device according to an embodiment of the disclosure.

Referring to FIG. 2, the electronic device 100 may include the camera 110, the microphone 120, a communicator 130, a processor 140, the display 150, a memory 160, an inputter 170, and a speaker 180. However, the configuration illustrated in FIG. 2 is an example diagram for implementing the embodiments of the disclosure, and appropriate hardware and software configurations apparent to those skilled in the art may be additionally included in the electronic device 100.

The camera 110 is a constituent element for capturing a surrounding region of the electronic device 100. More particularly, the camera 110 may obtain an image of the external device by capturing the external device located around the electronic device 100. The camera 110 may be variously implemented according to the type of the electronic device 100, such as a red green blue-depth (RGB-D) camera, a 3 dimensional (3D) camera, or an infrared camera.

The microphone 120 may receive the user's voice. More particularly, the microphone 120 may receive a user's voice for requesting for the solution information for solving the problem regarding the external device. In addition, the microphone 120 may receive various user's inquiries, in addition to the solution information.

Meanwhile, the microphone 120 may be provided in the electronic device 100 or may also be provided outside and electrically connected to the electronic device 100. In addition, if the microphone 120 is provided outside, the microphone 120 may transmit a generated user's voice signal to the processor 140 through a wired/wireless interface (e.g., Wi-Fi or Bluetooth).

The communicator 130 may include various communication modules to communicate with the external device or the server. As an example, the communicator 130 may include a wireless communication module, and may include, for example, a cellular communication module using at least one of long term evolution (LTE), LTE Advanced (LTE-A), 5th Generation (5G), code division multiple access (CDMA), wideband CDMA (WCDMA), universal mobile telecommunications system (UMTS), Wireless Broadband (WiBro), or Global System for Mobile Communications (GSM). As another example, the wireless communication module may include, for example, at least one of wireless fidelity (Wi-Fi), Bluetooth, Bluetooth Low Energy (BLE), Zigbee, near field communication (NFC), Magnetic Secure Transmission, radio frequency (RF), or a body area network (BAN).

More particularly, the user's voice and the information on the external device may be transmitted to the server via the communicator 130. In addition, the communicator 130 may receive a content related to the solution information from the content of the device related to the external device.

The processor 140 may be electrically connected to the memory 160 to control general operations and functions of the electronic device 100. More particularly, the processor 140 may obtain the information on the external device by capturing the image of the external device through the camera 110. The information on the external device may include the image of the external device or feature data obtained through the image of the external device. In addition, the information on the external device may include identification data of the external device (e.g., manufacturer, product name, production year, manufacturing number and the like of the external device) obtained through the image of the external device. Specifically, the electronic device 100 may obtain identification data of the external device through a barcode, a QR code, a manufacturer trademark, and the like of the external device included in the image of the external device.

While obtaining the information on the external device, when the user's voice for requesting for the solution information for solving the problem regarding the external device is input, the processor 140 may control the communicator 130 to transmit the input user's voice and the information on the external device to the server 200.

The processor 140 may receive the content related to the solution information from the content of the device related to the external device from the server 200 via the communicator 130. The content related to the solution information may include at least one of the manual of the device related to the external device, the video content related to the solution information from the guide video content for the device related to the external device, and a subtitle of the video content related to the solution information.

Meanwhile, the processor 140 may obtain a text corresponding to the solution information from the manual, and identify whether the region corresponding to the solution information exists in the image of the external device based on the obtained text. Specifically, the processor 140 may grasp the intent of the user's voice by inputting the user's voice input through the microphone 120 to the first dialogue system stored in the memory 160. The processor 140 may search for and obtain the text related to the solution information from the manual related to the external device 10.

The processor 140 may analyze the obtained text to identify the region or the location corresponding to the solution information of the device related to the external device. The processor 140 may identify the region or location identified through the device related to the external device, as the region or the location corresponding to the solution information of the external device. For example, if the region related to the solution information of the device related to the external device is identified as the lower right region of the device related to the external device, the processor 140 may identify the region related to the solution information of the external device as the lower right region of the external device. The processor 140 may identify whether the region corresponding to the solution information exists in the image of the external device obtained through the camera 110.

If it is identified that the region corresponding to the solution information does not exist in the image of the external device, the processor 140 may provide a message instructing to capture the region of the external device corresponding to the solution information. Specifically, the processor 140 may control the display 150 to display the message or control the speaker 180 to output the message as a voice. Meanwhile, if it is identified that the region corresponding to the solution information exists in the image of the external device, the processor 140 may control the display 150 to display a text related to the solution information on the region.

Meanwhile, if it is identified that the region corresponding to the solution information exists in the image of the external device, the processor 140 may obtain a subtitle related to the obtained text from the subtitle of the video content related to the solution information. The processor 140 may identify a point when the obtained subtitle is displayed on the video content and extract the video content corresponding to the identified point from the video content. The processor 140 may control the display 150 to display at least one of a GUI or a hyper link for viewing the video content corresponding to the identified point in the region corresponding to the solution information of the image of the external device. When at least one of the GUI or the hyper link is selected, the processor 140 may control the display 150 to display the video content corresponding to the point on one region of the image of the external device.

Meanwhile, the function related to artificial intelligence according to the disclosure is operated through the processor 140 and the memory 160.

The processor 140 may be formed of one or a plurality of processors. The one or the plurality of processors 140 may be a general-purpose processor, such as a central processing unit (CPU), or an application processor (AP), a graphic dedicated processor, such as a graphics-processing unit (GPU) or a visual processing unit (VPU), or an artificial intelligence dedicated processor, such as a neural processing unit (NPU), or the like.

The one or the plurality of processors may perform control to process the input data according to a predefined action rule stored in the memory 160 or an artificial intelligence model. The predefined action rule or the artificial intelligence model is formed through training.

Being formed through training herein may, for example, imply that a predefined action rule or an artificial intelligence model for a desired feature is formed by applying a learning algorithm to a plurality of pieces of training data. Such training may be performed in a device demonstrating artificial intelligence according to the disclosure or performed by a separate server and/or system.

The artificial intelligence model may include a plurality of neural network layers. Each layer has a plurality of weight values, and executes processing of the layer through a processing result of a previous layer and processing between the plurality of weight values. Examples of the neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-network, but the neural network of the disclosure is not limited to the above examples, unless otherwise noted.

The learning algorithm may be a method for training a predetermined target machine (e.g., a robot) by using a plurality of pieces of training data to allow the predetermined target device to determine or predict by itself. Examples of the learning algorithm include supervised learning, unsupervised learning, semi-supervised learning, or reinforcement learning, but the learning algorithm of the disclosure is not limited to the above examples, unless otherwise noted.

The display 150 may display various pieces of information according to the control of the processor 140. More particularly, the display 150 may display the image of the external device captured through the camera 110. In addition, the processor 140 may display the content related to the solution information on the image of the external device by the control of the processor 140. The processor 140 may display the message instructing to capture the region corresponding to the solution information of the external device.

The display 150 may be implemented as a touch screen along with a touch panel or this is merely an embodiment of the disclosure, and the display may be variously implemented according to the type of the electronic device 100.

The memory 160 may store an instruction or data related to at least one of other components of the electronic device 100. More particularly, the memory 160 may be implemented as a non-volatile memory, a volatile memory, a flash memory, a hard disk drive (HDD), or a solid-state drive (SSD). The memory 160 may be accessed by the processor 140 and reading, recording, editing, deleting, or updating of the data by the processor 140 may be executed. A term, memory, in the disclosure may include the memory 160, a read only memory (ROM) (not illustrated) and a random access memory (RAM) (not illustrated) in the processor 140, or a memory card (not illustrated) (e.g., a micro secure digital (SD) card or a memory stick) mounted on the electronic device 100. The memory 160 may store programs, data, and the like for configuring various screens to be displayed in a display area of the display.

More particularly, the memory 160 may store a first dialogue system. The dialogue system may include an artificial intelligence model which performs voice recognition and language analysis of a user's voice input through the microphone 120 and provides a response. The first dialogue system may include various software modules and each software module may be controlled by the processor 140. The first dialogue system may include an automatic speech recognition (ASR) module, a natural language understanding (NLU) module, a dialogue manager (DM) module, a natural language generator (NLG) module, a text-to-speech (TTS) module, and a knowledge database.

Meanwhile, the memory 160 may store a first appearance recognition model which is an artificial intelligence model which outputs feature data of the external device by using the image of the external device. The first appearance recognition model may output the feature data of the external device implemented as a vector or matrix state.

The inputter 170 may receive a user input for controlling the electronic device 100. More particularly, the inputter 170 may include a touch panel for receiving a user touch using user's fingers or a stylus pen, a button for receiving user manipulation, and the like. In addition, the inputter 170 may be implemented as other input devices (e.g., a keyboard, a mouse, a motion inputter, or the like). More, particularly, the inputter 170 may receive a user touch for selecting at least one of the hyper link or GUI for displaying the video content.

The speaker 180 may output not only various pieces of audio data obtained by executing various processing, such as decoding, amplification, or noise filtering by an audio processor, but also various alerts or voice messages. More particularly, the speaker 180 may output a response to the user's voice obtained through the first dialogue system as a voice message in a natural language. The speaker 180 may output the message instructing to capture the region of the external device corresponding to the solution information as a voice. Meanwhile, the constituent element for outputting the audio data may be implemented as the speaker, but this is merely an embodiment of the disclosure, and the above constituent element may be implemented as an output terminal capable of outputting the audio data.

Figure 3:
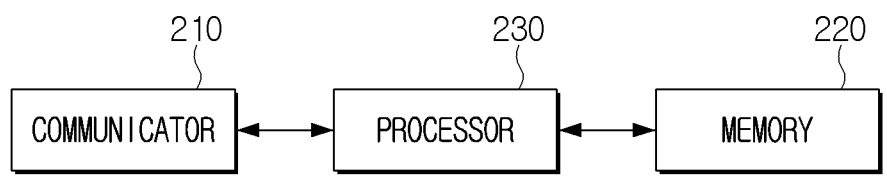
FIG. 3 is a block diagram schematically illustrating a configuration of a server according to an embodiment of the disclosure.

FIG. 3 is a block diagram schematically illustrating a configuration of a server according to an embodiment of the disclosure.

Referring to FIG. 3, the server 200 may include a communicator 210, a memory 220, and a processor 230.

The communicator 210 may communicate with the electronic device 100 or the external device and include various communication modules. The various communication modules have been described above with reference to FIG. 2, and therefore the overlapped description will not be repeated.

The memory 220 may store an instruction or data related to at least another constituent element of the server 200. The memory 220 may be variously implemented as a flash memory or the like, the specific embodiment has been described above with reference to FIG. 2, and therefore the overlapped description will not be repeated.

The memory 220 may store a second dialogue system. The second dialogue system may include various software modules (e.g., ASR module, NLU module, DM module, TTS module, or the like) controlled by the processor 230 in the same manner as the first dialogue system. However, an amount of the training data stored in the second dialogue system may be greater than an amount of training data stored in the first dialogue system. The artificial intelligence model trained using a large amount of training data may output a voice recognition result and a language analysis result having higher reliability for the same input voice, compared to the artificial intelligence model trained by using a relatively small amount of training data.

The memory 220 may store a second appearance recognition model which is an artificial intelligence model which outputs an appearance similarity value between the pre-stored devices and the external device. The second appearance recognition model may extract feature data of the image of the external device. The second appearance recognition model may output the appearance similarity value by comparing the extracted feature data with feature data of images of the pre-stored devices. The second appearance recognition model may output a more accurate appearance similarity value, since the amount of the training data may be larger than that of the first appearance recognition model.

The memory 220 may store a frequently asked question (FAQ) database including questions for the pre-stored devices and contents corresponding to each question. The FAQ database may store FAQs for various devices and contents related to the solution information for solving each FAQ in advance.

The processor 230 may be electrically connected to the memory 220 to control general operations and functions of the server 200. More particularly, the processor 230 may receive the user's voice for requesting for the solution information for solving the problem regarding the electronic device 100 and the information on the external device from the electronic device via the communicator 210.

The processor 230 may identify the device related to the external device based on the information on the external device. In an embodiment of the disclosure, the processor 230 may obtain the appearance similarity value between the pre-stored devices and the external device by inputting the image of the external device or the feature data of the external device to the appearance recognition model. The processor 230 may identify an external device having the appearance similarity value exceeding a threshold value as the device related to the external device. In addition, the processor 230 may identify an external device having a highest appearance similarity value as the device related to the external device.

In another embodiment of the disclosure, the processor 230 may identify the device related to the external device based on identification data of the external device (e.g., a product name, a production number, a production year, a manufacturer, or the like of the external device). For example, the processor 230 may identify a device having the same production name, production year, and manufacturer as the external device among the pre-stored devices as the device related to the external device. In still another embodiment of the disclosure, when comparing the production numbers of the pre-stored devices with the production number of the external device, the processor 230 may identify a device having a production number with a smallest error as the device related to the external device.

The processor 230 may obtain a content related to the solution information among the pre-stored contents of the identified device related to the external device. Specifically, the processor 230 may grasp the intent of the user's voice by inputting the user's voice to the second dialogue system. The processor 230 may obtain the content related to the solution information among the pre-stored contents of the device related to the external device. The processor 230 may control the communicator 210 to transmit the obtained content related to the solution information to the electronic device 100. The embodiment related thereto will be described with reference to FIG. 4.

Figure 4:
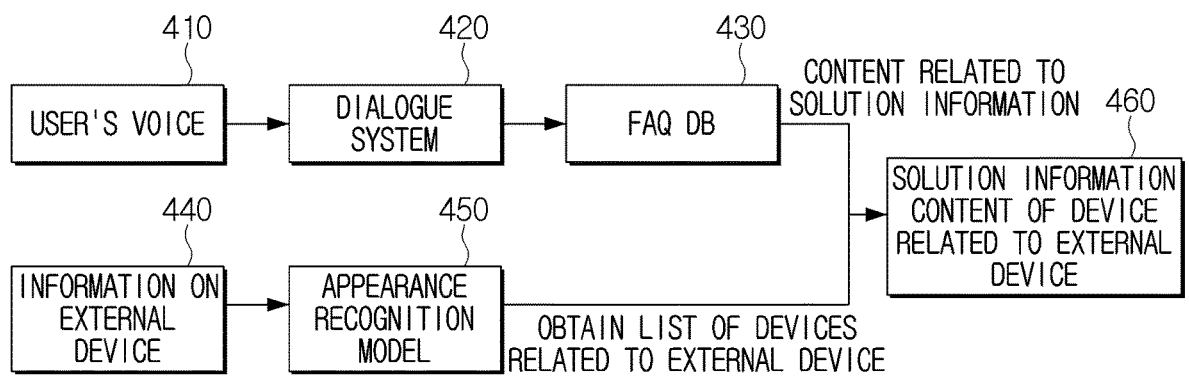
FIG. 4 is a diagram illustrating a process in which a server or an electronic device obtains a solution information content of a device related to an external device according to an embodiment of the disclosure.

FIG. 4 is a diagram illustrating a process in which a server or an electronic device obtains a solution information content of a device related to an external device according to an embodiment of the disclosure.

Referring to FIG. 4, the server 200 may grasp the intent of a user's voice 410 by inputting the user's voice 410 received from the electronic device 100 to a second dialogue system 420. The server 200 may obtain the content related to the solution information among the contents stored in an FAQ DB 430 based on the grasped intent of the user. Specifically, the FAQ DB 430 may store FAQs for various devices and contents related to the solution information for solving each FAQ in advance, and each content may be added, removed, or changed according to a user command. Accordingly, the server 200 may identify the FAQ related to the solution information from the FAQ DB 430 and obtain the content related to the solution information for solving the identified FAQ.

While obtaining the content related to the solution information, the server 200 may identify the device having a similar appearance with the external device based on information 440 on the external device. Specifically, the server 200 may obtain the appearance similarity value between the external device and the pre-stored devices by inputting the information 440 on the external device to an appearance recognition model 450. Specifically, the appearance recognition model 450 may output the feature data of the external device based on the image of the external device. The appearance recognition model 450 may output the similarity value by matching the feature data of the external device to the feature data of the pre-stored devices. The server 200 may identify the device having the similarity value exceeding the threshold value as the device related to the external device.

Meanwhile, this is merely an embodiment of the disclosure, and the server 200 may identify the device related to the external device among the pre-stored devices based on the identification data of the external device.

In an embodiment of the disclosure, the server 200 may obtain a solution information content 460 of the device related to the external device among the contents related to the solution information obtained through the FAQ DB 430.

Meanwhile, in another embodiment of the disclosure, the server 200 may obtain the solution information content 460 of the device related to the external device by identifying the content related to the solution information among the contents of the identified device related to the external device.

The server 200 may transmit the solution information content 460 of the device related to the external device to the electronic device 100.

Meanwhile, in still another embodiment of the disclosure, the electronic device 100 may obtain the solution information content 460 of the device related to the external device through the first dialogue system and the first appearance recognition model stored in the memory 160. In other words, referring to FIG. 4, the embodiment in which the electronic device 100 obtains the solution information content 460 related to the external device by transmitting the user's voice 410 for requesting for the solution information for solving the problem regarding the external device and the information on the external device to the server 200 has been described, but this is merely an embodiment. In other words, the electronic device 100 may obtain the solution information content 460 of the device related to the external device without transmitting the user's voice 410 and the information on the external device to the server 200. Specifically, since the electronic device 100 includes the first dialogue system and the first appearance recognition model which perform the same or similar functions as the second dialogue system and the second appearance recognition model included in the server 200, the electronic device 100 may obtain the solution information content 460 of the device related to the external device according to the method shown in FIG. 4. The memory of the electronic device 100 may store the FAQ database, and the FAQ database may receive data updated on the server 200 from the server 200.

Figure 5A:
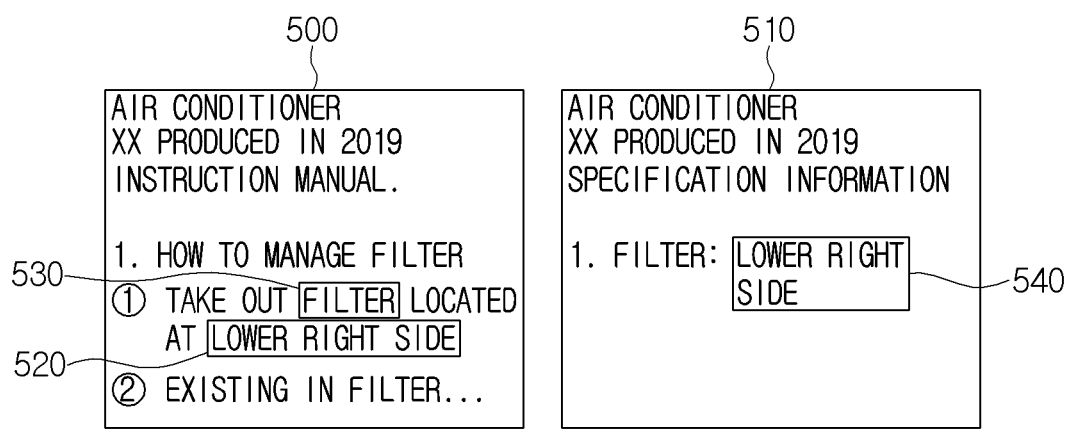
FIGS. 5A, 5B, and 5C are diagrams illustrating a method for providing a content related to solution information along with an image of an external device by an electronic device according to various embodiments of the disclosure.
Figure 5B:
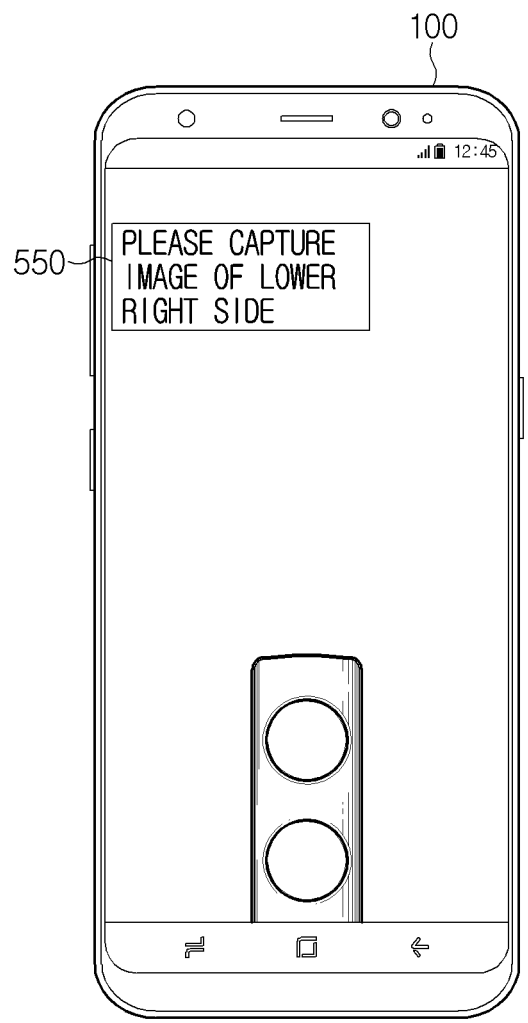
Figure 5C:
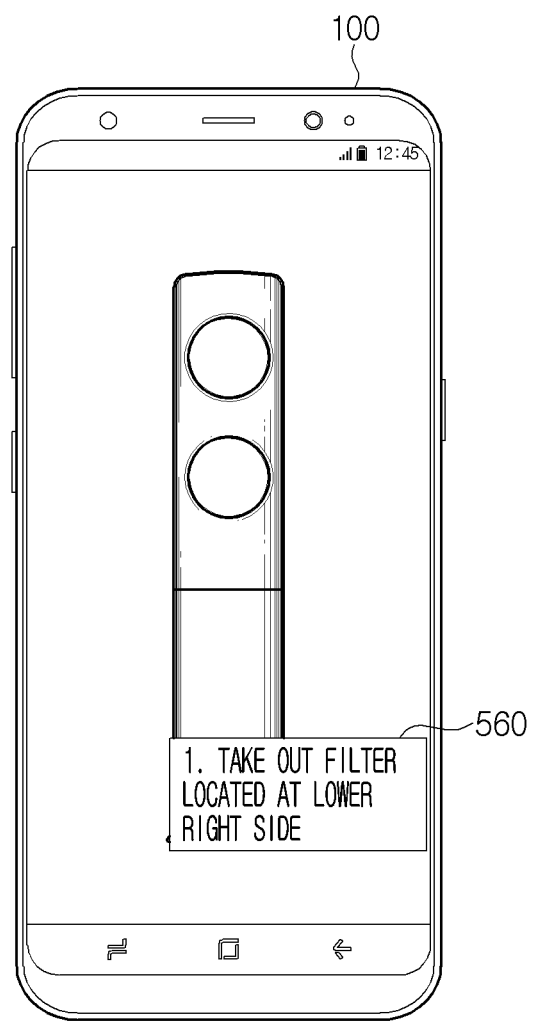

FIGS. 5A, 5B, and 5C are diagrams illustrating a process in which an electronic device provides a content related to an external device along with an image of the external device according to various embodiments of the disclosure.

Referring to FIGS. 5A, 5B, and 5C, the electronic device 100 may obtain texts 520 and 530 corresponding to the solution information from a manual 500 of the device related to the external device. Specifically, the electronic device 100 may grasp the intent of the user's voice by inputting the user's voice (e.g., "Let me know how to replace the air conditioner filter") to the first dialogue system. The electronic device 100 may obtain the texts 520 and 530 corresponding to the solution information among the texts included in the manual 500. The electronic device 100 may identify a region corresponding to the solution information of the device related to the external device based on the obtained texts 520 and 530. For example, referring to FIG. 5A, the electronic device 100 may analyze the obtained texts 520 and 530 and identify that a region in which the air conditioner filter exists which is the region corresponding to the solution information of the device related to the external device is the lower right region. Accordingly, the electronic device 100 may identify the region or location of the external device corresponding to the solution information as the lower right region of the external device.

In another embodiment of the disclosure, the electronic device 100 may analyze a text 540 of a manual 510 including information on a specification of the device related to the external device to identify the region or the location corresponding to the solution information of the device related to the external device.

The electronic device 100 may identify whether the region corresponding to the solution information exists in the image of the external device obtained through the camera 110. For example, referring to FIG. 5B, the electronic device 100 may identify whether the region corresponding to the solution information (e.g., lower right region where the air conditioner filter exists) exists in the image of the external device obtained through the camera 110. If it is identified that the lower right region of the external device does not exist in the image of the external device, the electronic device 100 may display a message 550 instructing to capture the image of the external device corresponding to the solution information (e.g., "Please capture an image of the lower right side").

In an embodiment of the disclosure, if it is identified that the region corresponding to the solution information exists in the image of the external device, referring to FIG. 5C, the electronic device 100 may display a text 560 obtained through the manual 500 in the region corresponding to the solution information. In another embodiment of the disclosure, the electronic device 100 may display at least one of an icon, a GUI, a hyper link capable of displaying the text obtained through the manual 500 on the region corresponding to the solution information. Accordingly, if at least one of the icon, the GUI, or the hyper link is selected, the electronic device 100 may display the obtained text on one region of the display 150.

Figure 6A:
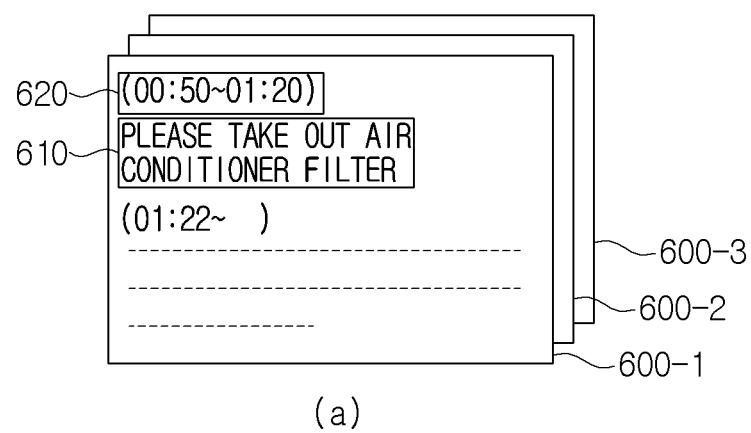
FIGS. 6A and 6B are diagrams illustrating a process in which an electronic device provides a video content related to solution information according to various embodiments of the disclosure.
Figure 6A:
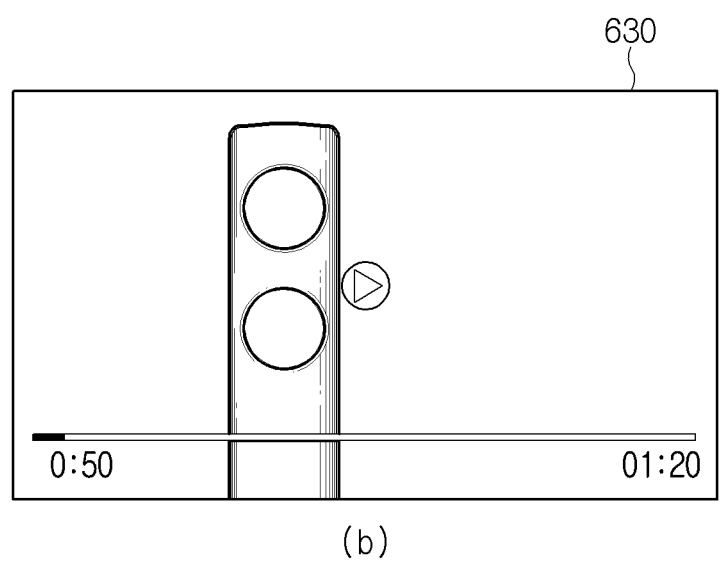
Figure 6B:
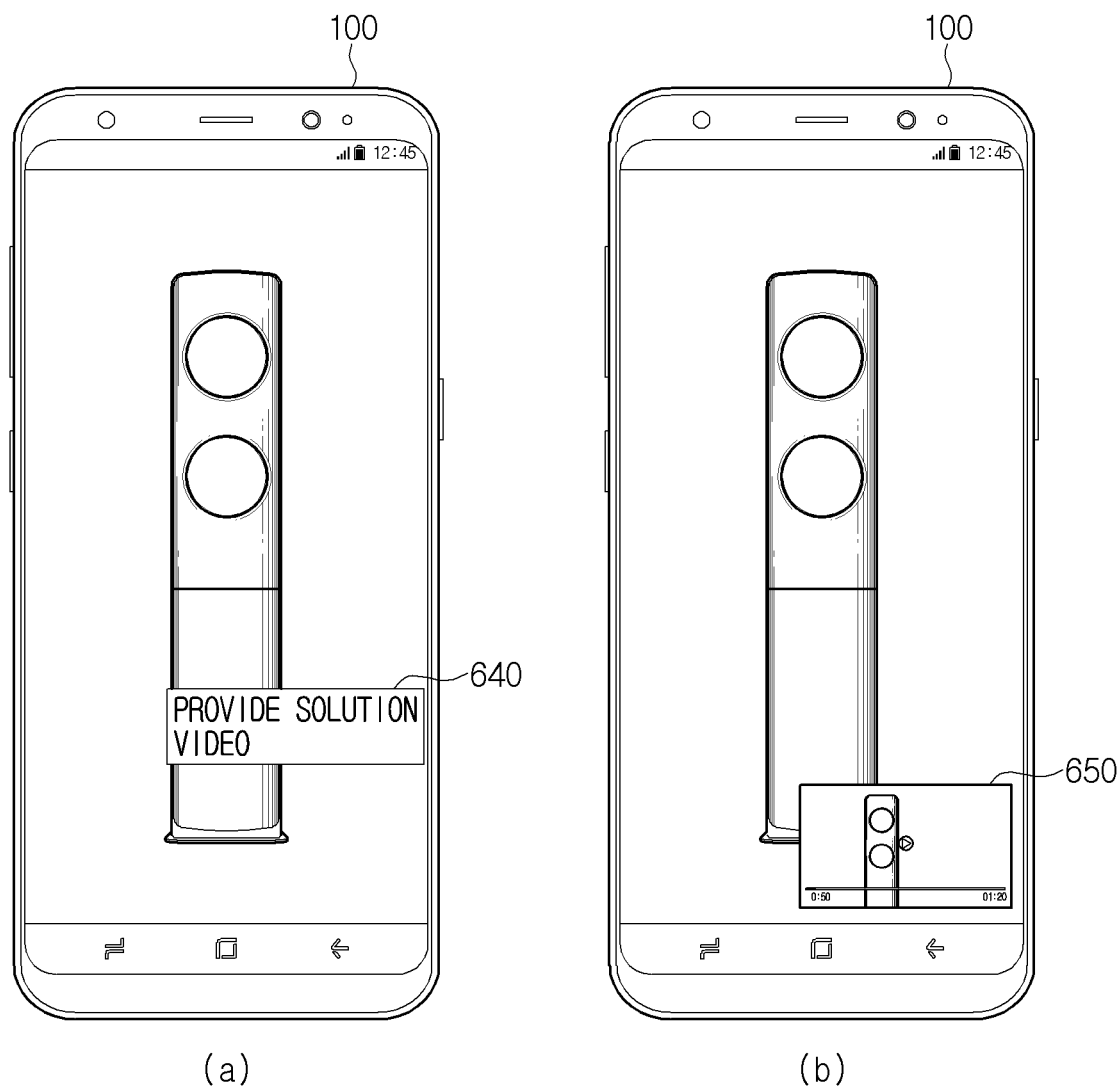

FIGS. 6A and 6B are diagrams illustrating a process in which an electronic device provides a content related to an external device along with an image of the external device according to various embodiments of the disclosure.

Referring to FIGS. 6A and 6B, the electronic device 100 may obtain a subtitle related to the text obtained through the manual 500 among subtitles 600-1, 600-2, 600-3, . . . of a video content related to the solution information. For example, referring to FIG. 6A, the electronic device 100 may identify and obtain a subtitle 610 related to the air conditioner filter which is the solution information among the subtitles of the content related to the solution information. The electronic device 100 may identify a point 620 at which the obtained subtitle is displayed on the video content (e.g., 0:50 to 1:20 with respect to the reproduction start point). The electronic device 100 may extract only a video content 630 corresponding to the identified point from the video content. In another embodiment of the disclosure, the electronic device 100 may control the video content so that the video content is reproduced from a start point of the identified point.

The electronic device 100 may display at least one of a GUI or a hyper link 640 for viewing the video content corresponding to the identified point from the video content on the region corresponding to the solution information on the image of the external device. For example, referring to FIG. 6B, the electronic device 100 may display a hyper link 640 (e.g., a hyper link implemented as a text "provided solution video") for viewing the video content corresponding to the identified point from the video content on the lower right region of the image of the external device. Accordingly, if the hyper link 640 is selected, the electronic device 100 may display the extracted video content on one region 650 of the display 150. In another embodiment of the disclosure, the electronic device 100 may control the display 150 so that the video content is reproduced from the start point of the identified point from the video content on one region 650 of the display 150. Meanwhile, FIG. 6B illustrates that the extracted video content is displayed on the lower right region of the display 150, but this is merely an embodiment of the disclosure, and the electronic device 100 may display the video content over the entire display 150, and the region for displaying the video content may be freely changed according to a user command.

FIG. 7 is a sequence diagram illustrating operations of an electronic device and a server according to an embodiment of the disclosure.

Referring to FIG. 7, first, the electronic device 100 may obtain the information on the external device by capturing the image of the external device at operation S710. The information on the external device may include the image of the external device and the feature data of the external device. The feature data of the external device is feature data obtained by inputting the image of the external device to the appearance recognition model and may be implemented in a vector or matrix form.

A user's voice for requesting for the information for solving the problem regarding the external device may be input to the electronic device 100 at operation S720. The electronic device 100 may grasp the meaning of the solution information included in the user's voice by inputting the user's voice to the first dialogue system. Meanwhile, the operation S710 of obtaining the information on the external device and the operation S720 of receiving the user's voice performed by the electronic device 100 may occur at the same time or within a threshold error range time.

The electronic device 100 may transmit the user's voice and the information on the external device to the server 200 at operation S730. The server 200 may identify the device related to the external device based on the information on the external device at operation S740. Specifically, the server 200 may obtain the feature data of the external device by inputting the information on the external device to the second appearance recognition model, and obtain the appearance similarity value by comparing the obtained feature data of the external device with the feature data of the pre-stored devices. The server 200 may identify the device having the appearance similarity value exceeding the threshold value as the device related to the external device.

The server 200 may obtain a content related to the solution information from the content of the pre-stored device related to the external device at operation S750. The server 200 may transmit the content related to the solution information to the electronic device 100 at operation S760. The electronic device 100 may provide the content related to the solution information along with the image of the external device obtained through the camera 110 at operation S770.

FIG. 8 is a flowchart illustrating a method for controlling an electronic device according to an embodiment of the disclosure.

Referring to FIG. 8, the electronic device 100 may obtain the information on the external device by capturing the image of the external device at operation S810. While obtaining the information on the external device, when the user's voice for requesting for the solution information for solving the problem regarding the external device is input, the electronic device 100 may transmit the input user's voice and the information on the external device to the server 200 at operation S820. Meanwhile, when the user's voice is input, the electronic device 100 may grasp the meaning of the solution information included in the user's voice.

The electronic device 100 may receive the content related to the solution information from the content of the device related to the external device from the server 200 at operation S830. The content related to the solution information may include at least one of a manual of the device related to the external device, a video content related to the solution information from a guide video content of the device related to the external device, and a subtitle of the video content related to the solution information. In another embodiment of the disclosure, the electronic device 100 may obtain the content related to the solution information from the content of the device related to the external device, on the device rather than the server. An embodiment of obtaining the content on the device has been specifically descried above with reference FIG. 4, and therefore the overlapped description will not be repeated.

The electronic device 100 may provide the content related to the solution information along with the image of the external device at operation S840.

Specifically, the electronic device 100 may obtain a text corresponding to the solution information from the manual related to the external device. The electronic device 100 may analyze the text and identify whether the region corresponding to the solution information exists in the image of the external device. If it is identified that the region corresponding to the solution information does not exist in the image of the external device, the electronic device 100 may provide a message instructing to capture the region of the external device corresponding to the solution information. If it is identified that the region corresponding to the solution information exists in the image of the external device, the electronic device 100 may display the obtained text on the region corresponding to the solution information of the image of the external device.

Meanwhile, if it is identified that the region corresponding to the solution information exists in the image of the external device, the electronic device 100 may obtain a subtitle related to the obtained text from the subtitles of the video content. The electronic device 100 may identify a point when the obtained subtitle is displayed on the video content, and extract the video content corresponding to the identified point from the video content. The electronic device 100 may display at least one of a GUI or a hyper link for viewing the extracted video content on the region corresponding to the solution information of the image of the external device. Accordingly, if at least one of the GUI or the hyper link is selected, the electronic device 100 may display the extracted video content on one region of the image of the external device.

FIG. 9 is a flowchart illustrating a method for controlling a server according to an embodiment of the disclosure.

Referring to FIG. 9, first, the server 200 may receive a user's voice for requesting for the solution information for solving the problem regarding the external device and the information on the external device from the electronic device at operation S910. The server 200 may identify the device related to the external device based on the information on the external device at operation S920. Specifically, the server 200 may obtain the feature data of the external device by inputting the image of the external device to the appearance recognition model. The server 200 may identify the device related to the external device based on the appearance similarity value between the feature data of the external device obtained through the appearance recognition model and the feature data of the pre-stored devices. In another embodiment of the disclosure, the server 200 may identify the device related to the external device by comparing or matching the identification data of the external device to the identification data of the pre-stored device.

Meanwhile, in an embodiment of the disclosure, the server 200 may obtain the content of the identified device related to the external device. While identifying the device related to the external device, the server 200 may grasp the meaning of the solution information included in the user's voice by inputting the user's voice to the second dialogue system. The server 200 may obtain the content related to the solution information from the content of the identified device related to the external device at operation S930.

In another embodiment of the disclosure, the server 200 may obtain the content related to the solution information from the content stored in the FAQ DB based on the meaning of the solution information gasped through the second dialogue system. Specifically, the FAQ DB may store FAQs for various devices and contents related to the solution information for solving each FAQ in advance. Accordingly, the server 200 may identify the FAQ related to the grasped meaning of the solution information among the FAQs pre-stored in the FAQ DB. The server 200 may obtain the content related to the solution information corresponding to the identified FAQ. The server 200 may obtain the content of the identified device related to the external device among the obtained contents related to the solution information.

The server 200 may transmit the content related to the solution information to the electronic device 100 at operation S940.

According to another embodiment of the disclosure, the electronic device 100 may identify the region or the location corresponding to the solution information of the device related to the external device through the manual of the device related to the external device and the video content related to the solution information from the guide video content received from the server 200. The electronic device 100 may identify the region or the location of the external device corresponding to the solution information based on the identified region or the location corresponding to the solution information of the device related to the external device. For example, if it is identified that the region corresponding to the solution information (e.g., if the user's voice for requesting for the method for replacing the filter is input, the solution information may be a method for replacing the filter) of the device related to the external device is the lower right region, the electronic device 100 may identify that the region of the external device corresponding to the solution information is the lower right region.

The electronic device 100 may identify a difference by comparing identified regions or locations of the device related to the external device and the external device. The electronic device 100 may identify the difference by comparing each region corresponding to the solution information of the device related to the external device and the external device based on the text or the image corresponding to the solution information from the manual of the device related to the external device. For example, if the region corresponding to the solution information of the device related to the external device is on the lower right side, the electronic device 100 may identify the difference by comparing the appearance between parts (or components) of the device related to the external device and the external device in the lower right region through the first appearance recognition model.

The electronic device 100 may obtain the video content related to the solution information through a generative model stored in the memory 160 based on the identified difference. In other words, the electronic device 100 may obtain the video content related to the solution information of the device related to the external device obtained by reflecting the identified difference. Specifically, if the appearance difference between the components in the lower region of the device related to the external device and the external device is identified, the electronic device 100 may change the video content so as to reflect the identified difference to the appearance of the component in the lower region of the device related to the external device from the video content related to the solution information.

Accordingly, if the GUI or the hyper link capable of viewing the video content related to the solution information is selected, the electronic device 100 may display the changed video content on one region or over the entire region of the display 150.

It should be noted that the accompanying drawings in the disclosure are not for limiting the technologies disclosed in this disclosure to a specific embodiment of the disclosure, but they should be interpreted to include all modifications, equivalents and/or alternatives of the embodiments of the disclosure. In relation to explanation of the drawings, similar reference numerals may be used for similar elements.

In this disclosure, the terms, such as "comprise", "may comprise", "consist of", or "may consist of" are used herein to designate a presence of corresponding features (e.g., constituent elements, such as number, function, operation, or part), and not to preclude a presence of additional features.

In this disclosure, expressions, such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., a first element) is "operatively or communicatively coupled with/ to" or is "connected to" another element (e.g., a second element), it should be understood that the certain element may be connected to the other element directly or through still another element (e.g., a third element). On the other hand, if it is described that a certain element (e.g., the first element) is "directly coupled to" or "directly connected to" another element (e.g., the second element), it may be understood that there is no element (e.g., the third element) between the certain element and the another element.

In addition, the expression "configured to" used in the disclosure may be interchangeably used with other expressions, such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

An electronic device according to various embodiments of the disclosure may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), a moving picture experts group layer-3 audio (MP3) player, a mobile medical device, a camera, a wearable device, or the like. In some embodiments of the disclosure, the electronic device may include at least one of, for example, a television, a refrigerator, an air conditioner, an air purifier, a set-top box, and a media box (e.g., SAMSUNG HOMESYNC™, APPLE TV™, or GOOGLE TV™).

A term "user" may refer to a person using an electronic device or a device using an electronic device (e.g., an artificial intelligence electronic device).

Various embodiments of the disclosure may be implemented as software including instructions stored in a storage medium (machine-readable storage media) readable by a machine (e.g., a computer). The machine is a device which invokes instructions stored in the storage medium and is operated according to the invoked instructions, and may include an electronic device (e.g., the electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium. For example, the "non-transitory storage medium" may include a buffer temporarily storing data.

According to an embodiment of the disclosure, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., a compact disc read only memory (CD-ROM)) or distributed online through an application store (e.g., PlayStore™). In a case of the on-line distribution, at least a part of the computer program product (e.g., a downloadable app) may be at least temporarily stored or temporarily generated in a machine-readable storage medium, such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments of the disclosure, may be performed sequentially, in a parallel, repetitive, or heuristically manner, or at least some operations may be performed in a different order, omitted, or may add a different operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a microphone;
   a display;
   a communicator comprising circuitry;
   a memory; and
   a processor configured to:
     capture an image of an external device through the camera,
     capture, through the microphone, a user's voice for requesting solution information for solving a problem regarding the external device,
     based on the user's voice, control the communicator to transmit a message comprising the user's voice and the image of the external device to a server,
     receive a content related to the solution information from a content of a device related to the external device from the server via the communicator, the content related to the solution information comprising a region on the external device for a next step for solving the problem, and
     control the display to provide the content related to the solution information along with the captured image,
   wherein the device related to the external device is identified based on the image of the external device,
   wherein the content related to the solution information comprises a text corresponding to the solution information from a manual of the device related to the external device, and
   wherein the processor is further configured to identify whether the region exists in the image of the external device based on the text.

2. The device of claim 1, wherein the content related to the solution information comprises at least one of the manual of the device related to the external device, a video content related to the solution information from a guide video content of the device related to the external device, or a subtitle of the video content related to the solution information.

3. The device of claim 1, wherein the processor is further configured to, based on identification that the region exists in the image of the external device, control the display to display the text on the region.

4. The device of claim 1, wherein the processor is further configured to:
   based on identification that the region exists in the image of the external device, obtain a subtitle related to the text from the subtitle of video content related to the solution information, and
   identify a point when the obtained subtitle is displayed on the video content.

5. The device of claim 4, wherein the processor is further configured to control the display to display at least one of a graphical user interface (GUI) or a hyper link for viewing a video content corresponding to the point from the video content on the region.

6. The device of claim 5, wherein the processor is further configured to, based on at least one of the GUI or the hyper link being selected, control the display to display the video content corresponding to the point on the region.

7. The device of claim 1, wherein the processor is further configured to, based on identification that the region does not exist in the image of the external device, provide a message instructing to capture the region.

8. A server comprising:
   a communicator comprising circuitry;
   a memory; and
   a processor configured to:
     receive a message comprising a captured user's voice for requesting solution information for solving a problem regarding an external device and an image of the external device from an electronic device via the communicator, identify a device related to the external device based on the image of the external device, obtain a content related to the solution information from a content of the identified device related to the external device, the content related to the solution information comprising a region on the external device for a next step for solving the problem, and control the communicator to transmit the content related to the solution information to the electronic device, wherein the content related to the solution information comprises a text corresponding to the solution information from a manual of the device related to the external device, and wherein the electronic device identifies whether the region exists in the image of the external device based on the text.

9. A method for controlling an electronic device, the method comprising:

capturing an image of an external device through a camera;

capturing, through a microphone, a user's voice for requesting solution information for solving a problem regarding the external device, based on the user's voice, transmitting a message comprising the user's voice and the image of the external device to a server;

receiving a content related to the solution information from a content of a device related to the external device from the server, the content related to the solution information comprising a region on the external device for a next step for solving the problem; and providing the content related to the solution information along with the captured image, wherein the device related to the external device is identified based on the image of the external device, wherein the content related to the solution information comprises a text corresponding to the solution information from a manual of the device related to the external device, and wherein the method further comprises identifying whether the region exists in the image of the external device based on the text.

10. The method of claim 9, wherein the content related to the solution information comprises at least one of the manual of the device related to the external device, a video content related to the solution information from a guide video content of the device related to the external device, or a subtitle of the video content related to the solution information.

11. The method of claim 9, wherein the providing of the content comprises, based on identification that the region exists in the image of the external device, displaying the text on the region.

12. The method of claim 9, wherein the providing of the content comprises:

based on identification that the region exists in the image of the external device, obtaining a subtitle related to the text from the subtitle of video content related to the solution information; and identifying a point when the obtained subtitle is displayed on the video content.

13. The method of claim 12, wherein the providing of the content comprises displaying at least one of a graphical user interface (GUI) or a hyper link for viewing a video content corresponding to the point from the video content on the region.

* * * * *